(12) United States Patent
Lee et al.

(10) Patent No.: US 7,225,002 B2
(45) Date of Patent: May 29, 2007

(54) INCLINED-TYPE MOBILE COMMUNICATION TERMINAL

(75) Inventors: Ki Young Lee, Kyungki-do (KR); Tae Ho Yun, Kyungki-do (KR); Chang Hun Park, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 75 days.

(21) Appl. No.: 11/098,297

(22) Filed: Apr. 4, 2005

(65) Prior Publication Data

US 2006/0160584 A1 Jul. 20, 2006

(30) Foreign Application Priority Data

Jan. 19, 2005 (KR) .................. 10-2005-004952

(51) Int. Cl.
*H04B 1/38* (2006.01)
*H04B 1/034* (2006.01)
*H04M 1/00* (2006.01)

(52) U.S. Cl. .............. 455/575.4; 455/575.1; 455/575.3; 455/90.3; 455/128

(58) Field of Classification Search .......... 379/433.04, 379/433.05, 433.06, 433.07, 428.01, 433.12, 379/433.13, 428.02; 455/575.3–575.5, 556.1, 455/556.2, 575.7, 575.8, 557–558, 550.1, 455/90.3, 128–129, 347–349, 575.1
See application file for complete search history.

(56) References Cited

U.S. PATENT DOCUMENTS 6,373,006 B1 4/2002 Toki
6,628,974 B1 9/2003 Lim
6,782,273 B2 * 8/2004 Ono et al. ............... 455/575.4
6,850,226 B2 * 2/2005 Finke-Anlauff ............. 345/169
6,917,824 B2 * 7/2005 Kobayashi ............... 455/575.3
2003/0064688 A1 * 4/2003 Mizuta et al. ............... 455/90
2004/0100758 A1 * 5/2004 Chen et al. ................ 361/681
2004/0248628 A1 * 12/2004 Taninai ................... 455/575.3
2005/0107137 A1 * 5/2005 Byun et al. .............. 455/575.1
2005/0137001 A1 * 6/2005 Bell et al. ................ 455/575.4
2005/0272487 A1 * 12/2005 Lee ......................... 455/575.4
2006/0003818 A1 * 1/2006 Navntoft et al. ......... 455/575.3
2006/0128361 A1 * 6/2006 Kim .......................... 455/411
2006/0146011 A1 * 7/2006 Pihlaja et al. .............. 345/156

FOREIGN PATENT DOCUMENTS

| JP | 2001127855 A | 5/2001 |
|---|---|---|
| JP | 2002044208 A | 2/2002 |
| JP | 2004235687 A | 8/2004 |

\* cited by examiner

*Primary Examiner*—Meless Zewdu
(74) *Attorney, Agent, or Firm*—Volpe and Koenig P.C.

(57) ABSTRACT

An inclined-type mobile communication terminal for opening/closing a main body using a link apparatus is provided. The inclined-type mobile communication terminal includes a first main body, a second main body, a driving unit, and a link unit. The driving unit is fixed to the first main body and provides a driving force required for moving the second main body. The link unit includes a driving link and a driven link. The driving link has its one side fixed to an output terminal of the driving unit and is rotated by the driving force of the driving unit, and has its other side rotatably connected with the second main body to move the second main body. The driven link connects the first and the second main bodies so as to guide a movement of the second main body using rotation of the driving link.

20 Claims, 18 Drawing Sheets

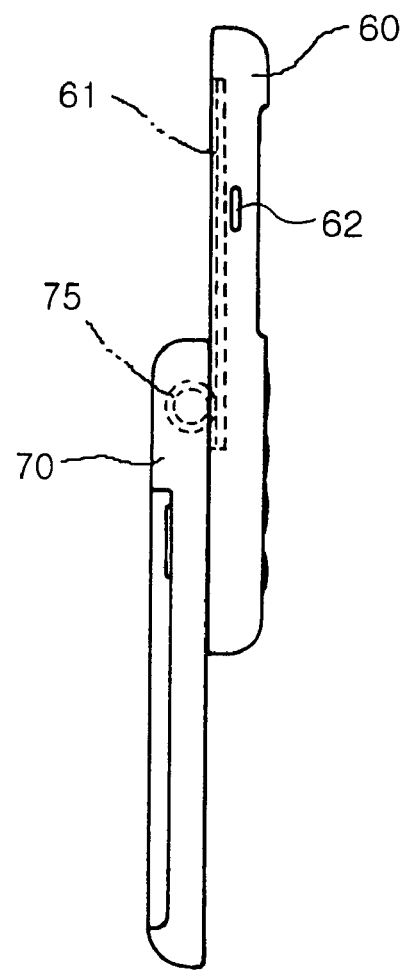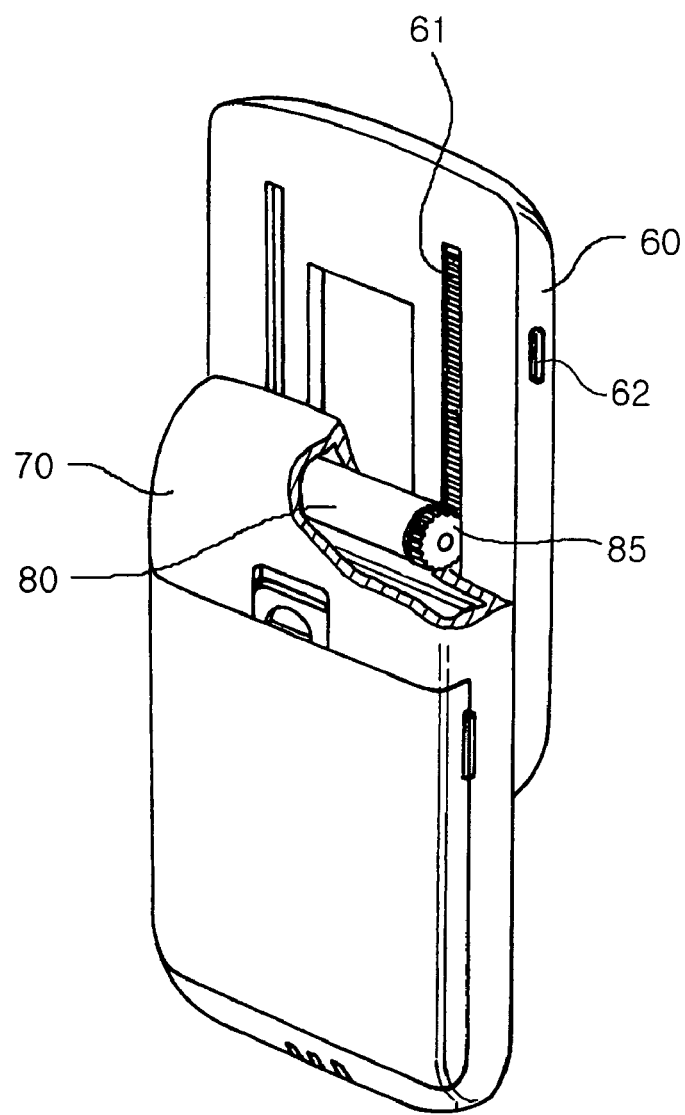
Prior art
FIG. 2a
Prior art
FIg. 2b

INCLINED-TYPE MOBILE COMMUNICATION TERMINAL

RELATED APPLICATION

The present application is based on, and claims priority from, Korean Application Number 2005-0004952, filed Jan. 19, 2005, the disclosure of which is hereby incorporated by reference herein in its entirety.

BACKGROUND OF THE INVENTION

1. Field of the Invention

The present invention relates to a mobile communication terminal, and more particularly, to a new inclined-type mobile communication terminal that is opened and closed automatically/manually using a link apparatus.

2. Description of the Related Art

Function of the mobile communication terminal is not limited to a communication but its function is widened to cover the Internet, moving image appreciation, and games. For that purpose, a size of a liquid crystal display (LCD) gets larger. Further, the terminal is gradually small-sized to increase portability of a mobile communication terminal.

A folder-type mobile communication terminal enjoys popularity in trends of reducing a terminal's size while increasing an LCD and a slide-type mobile communication terminal is currently on sale in the market.

The slide-type communication terminal includes a first main body and a second main body, and has a slide structure such that the second main body is relatively slid with respect to the first main body to open/close the terminal.

The slide-type communication terminal has a guide fixed to one side of the terminal, for guiding the sliding of the second main body and a slide module including a slider for performing reciprocating sliding motion along the guide. The slider is fastened to a side facing the one side to which the guide is fixed.

For example, in case the guide is provided to a backside of the second main body, the slider is joined to a front one side of the first main body contacting the guide and performs a reciprocating sliding motion together with the first main body.

FIG. 1 is a view illustrating a backside of a slide-type communication terminal of a related art, which will be described below.

The second main body 10 having a display screen (not shown) on its front surface and the first main body 20 having a battery pack 21 joined on its backside are overlapped in parallel with each other and perform reciprocating sliding motion, whereby the terminal is opened/closed. A guide slit 11 is formed on the backside of the second main body 10 and the second main body 10 has a guide (not shown) for guiding the sliding operation therein. The slider for performing reciprocating sliding motion along the guide slides together with the first main body 20.

However, referring to FIG. 1B, in the slide-type communication terminal of a related art, if an upper main body 10 is slid and a lower main body 20 is opened, an antenna 25 mounted on the lower main body 20 gets extremely close to the upper main body 10, thus antenna characteristics is influenced by the upper main body 10.

Further, the above-described manual slide module of the related art should be moved completely for opening/closing, so the module is not easily opened/closed with one hand and is relatively difficult to open/close compared with the folder-type terminal.

To improve the problems during the manual operation of the module, a backside of the slide-type communication terminal of the related art that realizes automatic opening/closing operations is schematically illustrated in FIG. 2.

A slide-type communication terminal of FIG. 2 includes a pinion 75 mounted on one end of the second main body 70; a rack 61 mounted lengthwise on one side of the first main body 60 for being engaged, in form of a teeth-joining, with the pinion 75; a driving motor (not shown) mounted on the second main body 70, for providing driving force; a power transfer part 80 for transferring the driving force of the driving motor to the pinion 75; and a control switch 62 for controlling an operation of the driving motor.

In operation, if a user manipulates the control switch with the second main body 70 closed so that the driving motor may be operated, torque of the driving motor is transferred to the pinion 75 through the power transfer part to allow the pinion 75 to be rotated and the rack 61 engaged with the pinion 75 is moved, whereby the first main body 60 is moved upward and so the opening operation is finally performed.

As described above, though the slide-type communication terminal of the related art that realizes the automatic operation using the pinion 75 and the rack 61 can realize the automatic operation in a simple manner, it is still difficult to open/close the terminal with one hand in realizing the manual operation like the manual slide-type communication terminal of the related art, compared with the folder-type communication terminal.

Further, in the slide-type mobile communication terminal, the first main body 60 and the second main body 70 perform a straight line motion on the same plane and so a receiver and a transmitter form 180°. Accordingly, the slide-type terminal provides inferior communication quality compared with the folder-type terminal and might cause inconvenience to the user accustomed to the folder-type communication terminal of the related art.

Further, similarly with the slide-type communication terminal illustrated in FIG. 1, in case the first main body 60 is slid and the second main body 70 is opened, the first main body 60 extremely gets close to the antenna mounted on the second main body 70. Accordingly, antenna characteristics are influenced by the first main body 60.

Therefore, an opening/closing method different from the type of the related art is required.

SUMMARY OF THE INVENTION

Accordingly, the present invention is directed to an inclined-type mobile communication terminal that substantially obviates one or more problems due to limitations and disadvantages of the related art.

An object of the present invention is to provide an inclined-type mobile communication terminal that is opened and closed in a manner different from a related art mobile communication terminal and such that automatic and manual operations are conveniently realized.

Another object of the present invention is to provide an inclined-type mobile communication terminal such that a receiver and a transmitter form an angle less than 180° as is done in a folder-type mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an inclined-type mobile communication terminal, which includes: a first main body; a second main body movable with respect to the first main body; a driving unit fixed to the first main body, for supplying driving force required for moving the second main body; and a link unit including a driving link having its one end fixed to an output terminal of the driving unit so as to be rotated by the driving force of the driving unit and having its other end rotatably connected with the second main body to move the second main body, and a driven link for connecting the first main body with the second main body so that a movement of the second main body may be guided by rotation of the driving link, whereby if the driving link is rotated by the driving force of the driving unit, the second main body connected with the driving link is guided and moved by the driven link.

The link unit may additionally have a fixed plate on which the driving unit is mounted and fixed to an upper portion of the first main body and a coupler link fixed to a lower portion of the second main body, and the driving link connects the terminal of the driving unit with one side of the coupler link fixed to the second main body and rotates to move the second main body, and the driven link connects a fixed plate fixed to the first main body with the coupler link fixed to the second main body.

More preferably, one side of the driven link is rotatably connected with the other side of the coupler link and the other side of the driven link is rotatably connected with a shaft support part installed at the fixed plate or can be slid along a guide part formed at the fixed plate.

Further, the one side of the driven link receives the other side of the coupler link in a sliding manner or is slid along the guide part formed at the coupler link, the other side of the driven link can also be rotatably connected with the shaft support part installed at the fixed plate.

The driving unit may have a motor part for supplying driving force required for moving the second main body and a power transfer part connected with a rotational shaft of the motor part, for transferring the driving force of the motor part.

At this point, the power transfer part may have a pair of members selectively engaged and an elastic member for allowing the one pair of members to be selectively engaged. The one pair of members include a hinge shaft fixed to the rotational shaft of the motor part, for transferring the driving force of the motor part and a slide cam selectively engaged with the hinge shaft by a predetermined angle.

Further, the power transfer part may additionally have a guide cam for relatively restricting the slide cam in a rotational direction and receiving the slide cam in a movable manner to an axial direction and connected with the driving link, and the elastic member may provide elastic force for allowing the slide cam to be selectively engaged with the hinge shaft.

Further, the mobile communication terminal can further include a sensor unit having a contact type sensor or a non-contact type sensor for detecting that a predetermined portion of the hinge shaft is rotated a predetermined angle with respect to the motor part in order to control completion of a sliding operation; and a driving controller for controlling a driving of the motor part using a signal of the sensor unit.

According to an another aspect of the present invention, there is provided an inclined-type mobile communication terminal, which includes: a first main body; a second main body movable with respect to the first main body; a link unit including a driving link having its one side rotatably connected with the first main body and having its other side rotatably connected with the second main body, for moving the second main body while being rotated by external force, whereby if the driving link is rotated by the external force the second main body connected with the driving link is guided and moved by the driven link.

The link unit may additionally have a fixed plate fixed to an upper portion of the first main body and a coupler link fixed to a lower portion of the second main body, and the driving link connects one side of the fixed plate fixed to the first main body with one side of the coupler link fixed to the second main body and rotates to move the second main body, and the driven link connects the fixed plated fixed to the first main body with the coupler link fixed to the second main body.

At this point, one side of the driven link is rotatably connected with the other side of the coupler link, and the other side of the driven link is rotatably connected with a shaft support part installed at the fixed plate.

In addition, the mobile communication terminal can further include a power transfer unit having an elastic member for restricting rotation of the driving link or the driven link by providing elastic force if external force for moving the second main body dose not exist and allowing the driving link to be rotated by being transformed by the elastic force if external force greater than the elastic force is applied. The driven link may have its one side fixed to one side of the power transfer unit so as to be selectively rotated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a view schematically illustrating a slide-type communication terminal of a related art, in which

FIG. 2 is a view schematically illustrating an automatic-slide type communication terminal of a related art, in which FIG. 2A is a side view of the terminal and FIG. 2B is a backside, partially cut, perspective view of the terminal;

FIG. 3 is a perspective view illustrating an operation of an inclined-type mobile communication terminal according to the present invention, in which

FIG. 5 is a view illustrating a structure and an operation of the link unit illustrated in FIG. 4, in which

FIG. 6 is a view illustrating a structure and an operation of the link unit according to another embodiment of the present invention, in which

FIG. 8 is a view illustrating a structure and an operation of the link unit according to still another embodiment of the present invention, in which

FIG. 10 is a cross-sectional view illustrating an operation of a driving unit during automatic and manual operations according to the first embodiment of the present invention, in which

DETAILED DESCRIPTION OF THE INVENTION

Reference will now be made in detail to the preferred embodiments of the present invention, examples of which are illustrated in the accompanying drawings.

Figure 1A:
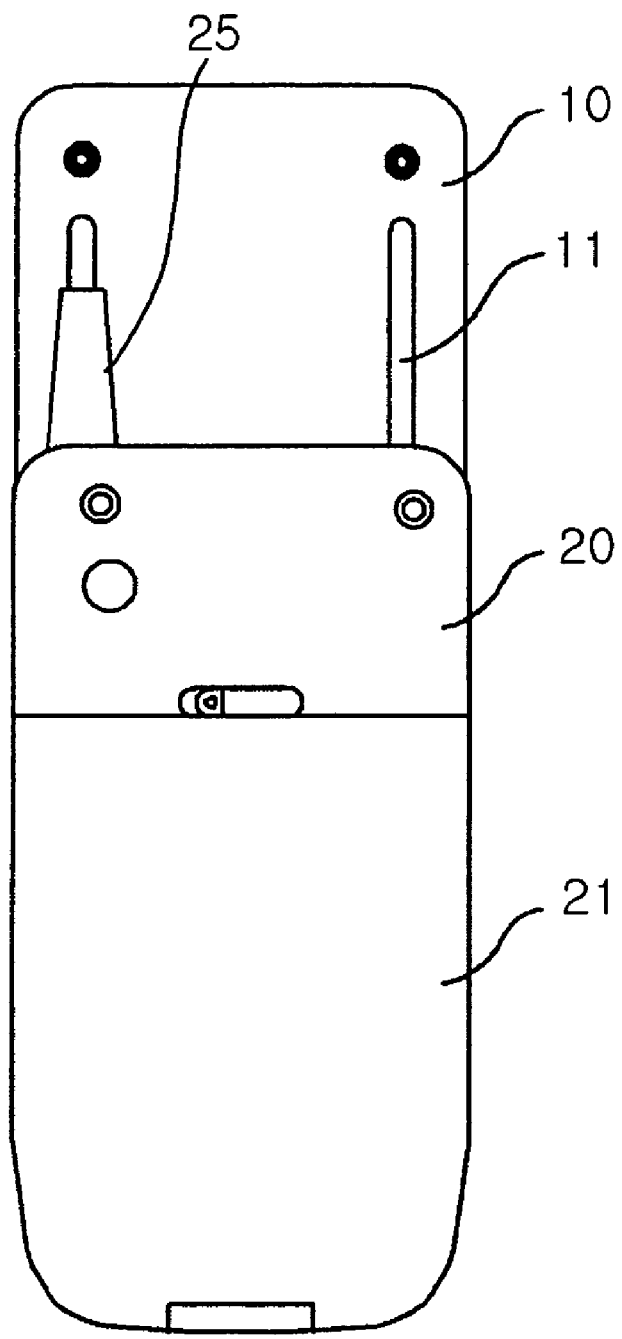
FIG. 1A is a backside view of the terminal and FIG. 1B is a side view of the terminal.
Figure 1B:
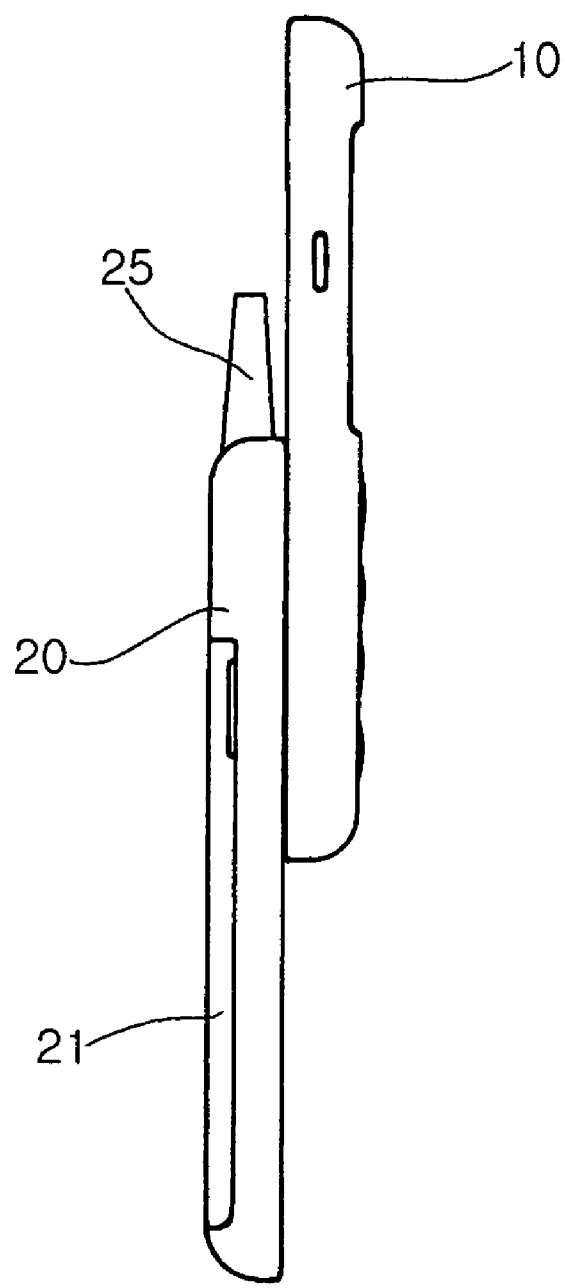
Figure 3A:
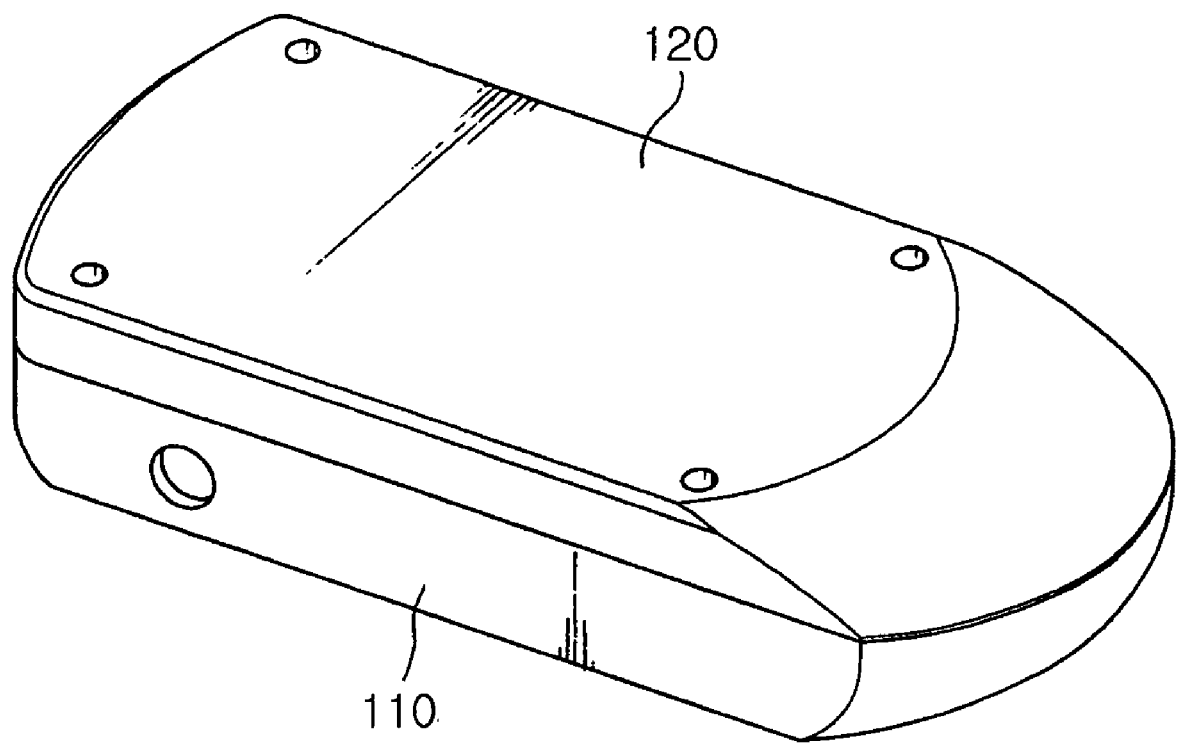
FIG. 3A is a view illustrating a state before the second main body is moved.
Figure 3B:
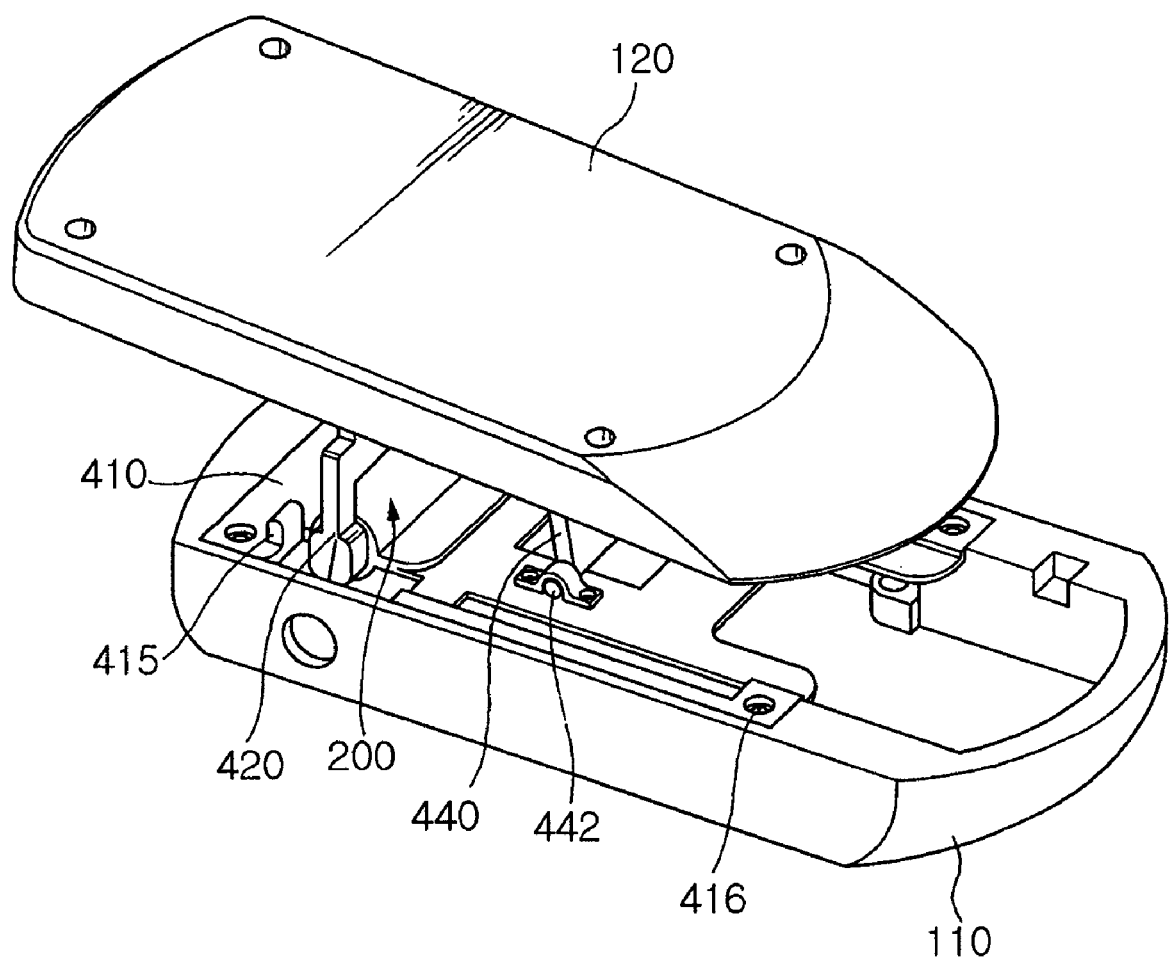
FIG. 3B is a view illustrating a state in which the second main body is moving.
Figure 3C:
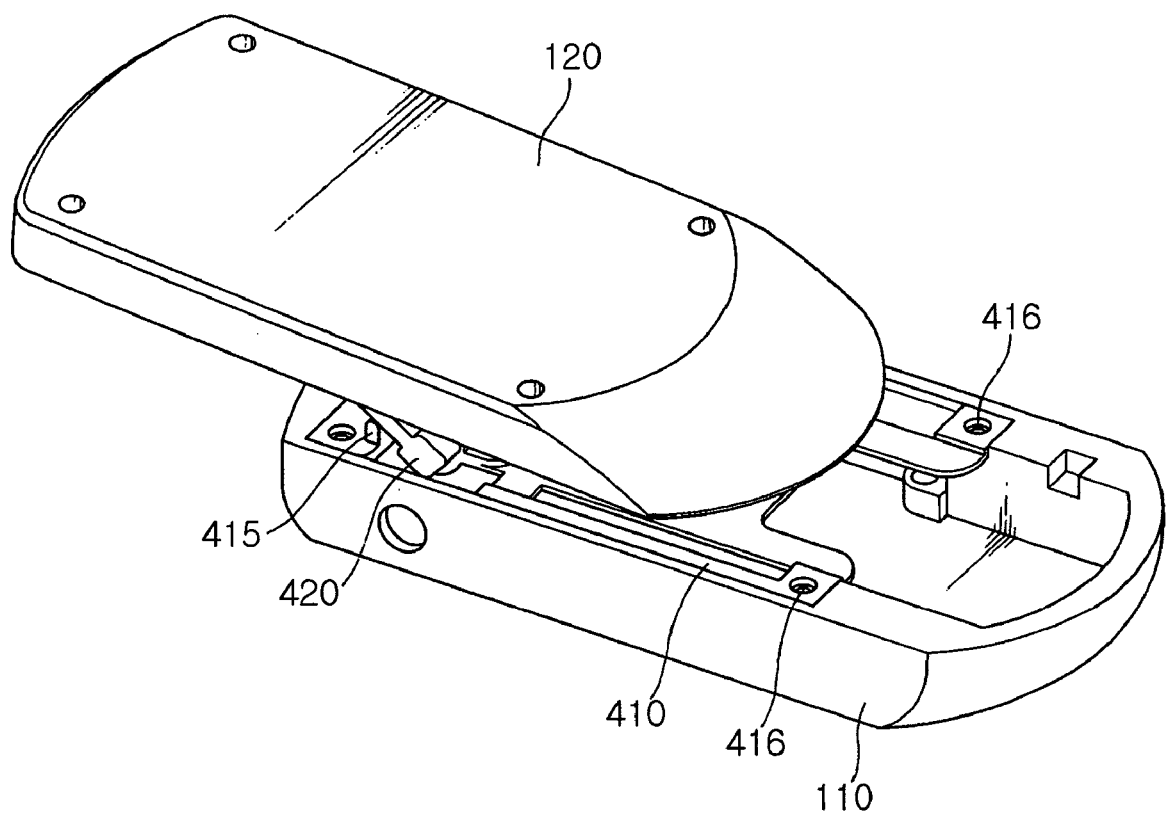
FIG. 3C is a view illustrating a state in which movement of the second main body is completed.
Figure 4:
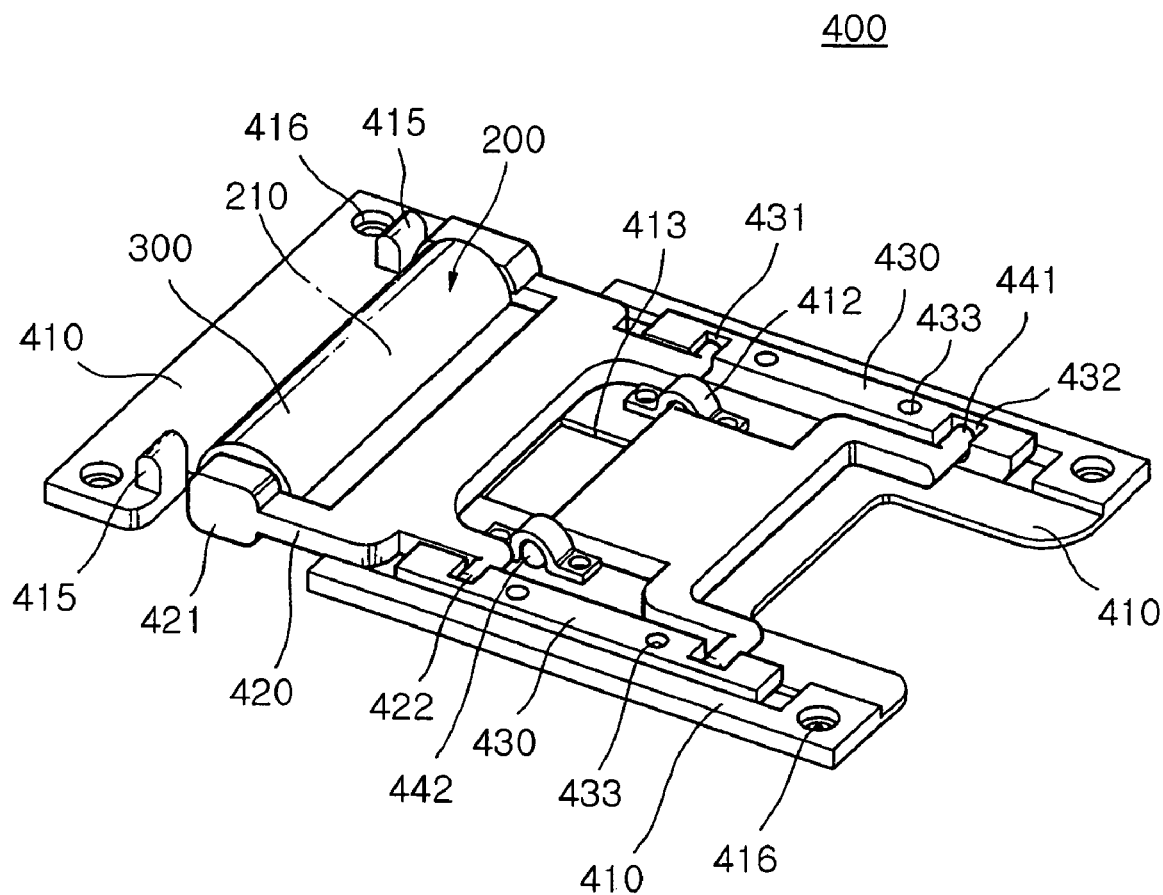
FIG. 4 is a perspective view illustrating a link unit of an inclined-type mobile communication terminal according to the first embodiment of the present invention.
Figure 5A:
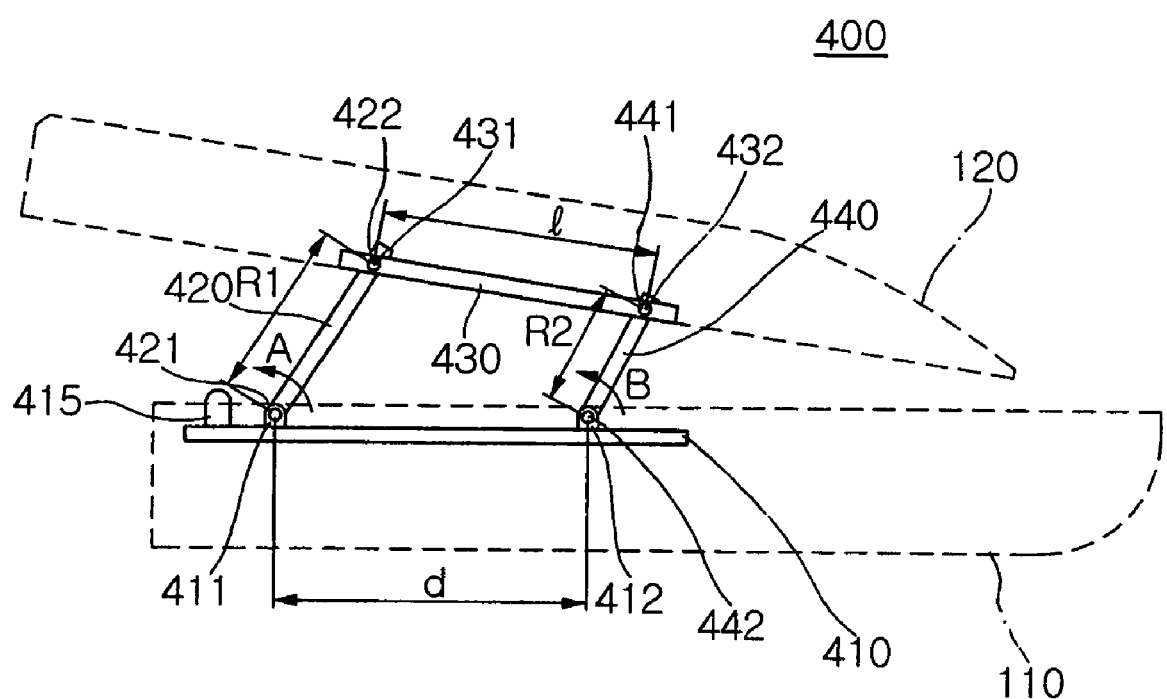
FIG. 5A is a view illustrating a state before the second main body is moved.

FIG. 3 is a perspective view illustrating an operation of an inclined-type mobile communication terminal according to the present invention, FIG. 4 is a perspective view illustrating a link unit of an inclined-type mobile communication terminal according to the first embodiment of the present invention, and FIG. 5 is a view illustrating a structure and an operation of the link unit illustrated in FIG. 4.

Figure 6A:
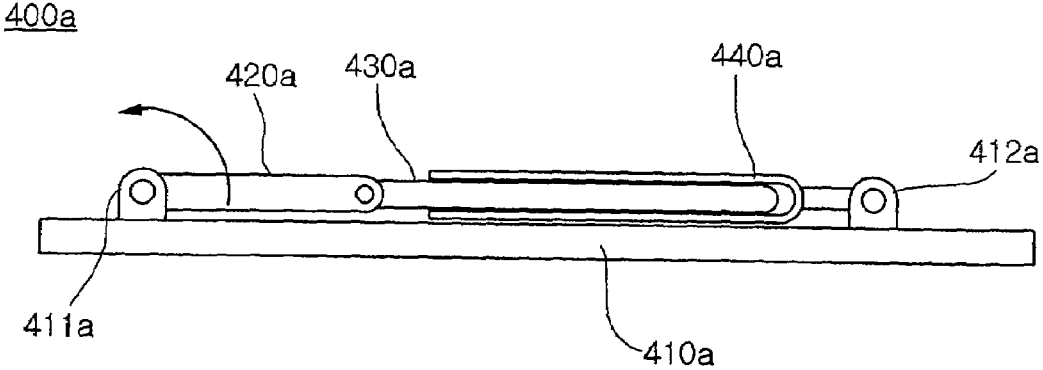
FIG. 6A is a view illustrating a state before the second main body is moved.
Figure 6B:
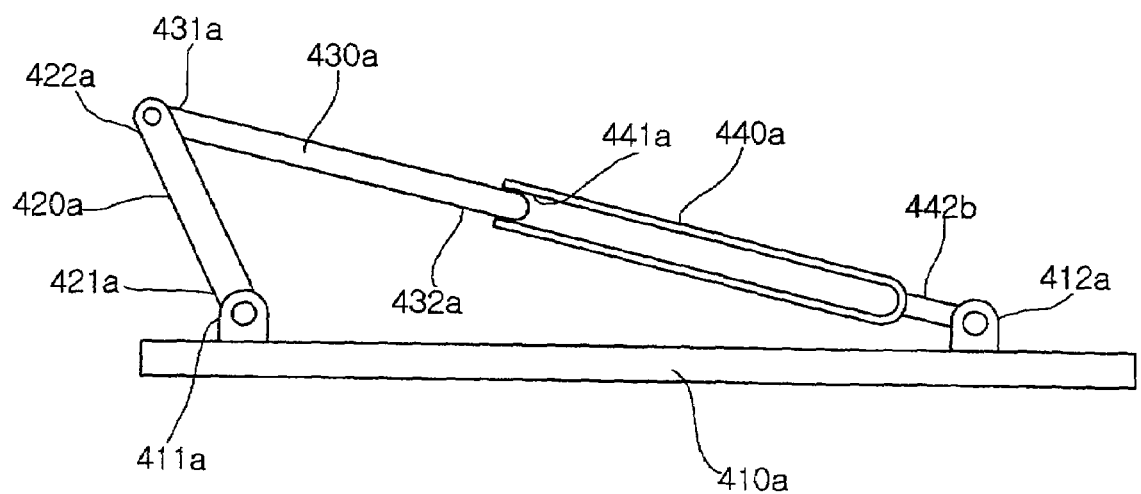
FIG. 6B is a view illustrating a state in which movement of the second main body is completed.
Figure 7:
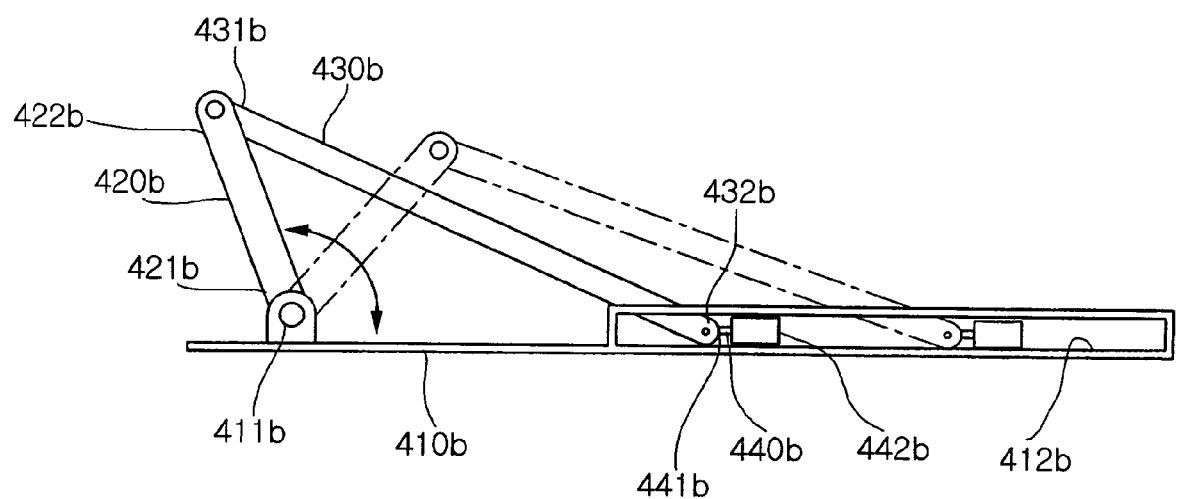
FIG. 7 is a view illustrating a structure and an operation of the link unit according to further another embodiment of the present invention.
Figure 8A:
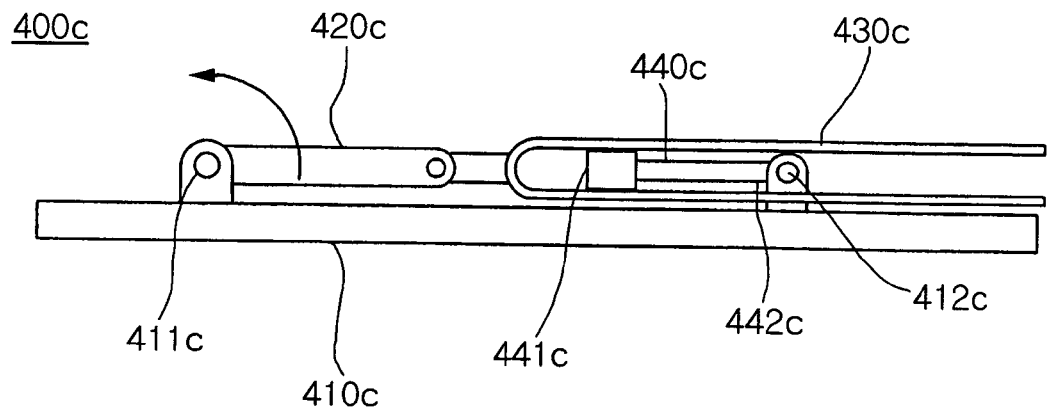
FIG. 8A is a view illustrating a state before the second main body is moved.
Figure 8B:
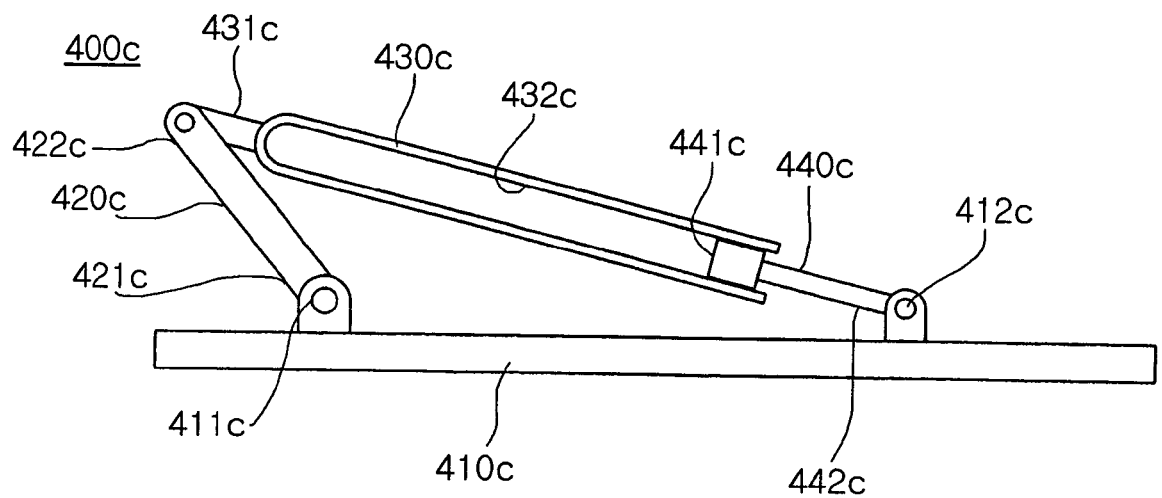
FIG. 8B is a view illustrating a state in which movement of the second main body is completed.
Figure 9:
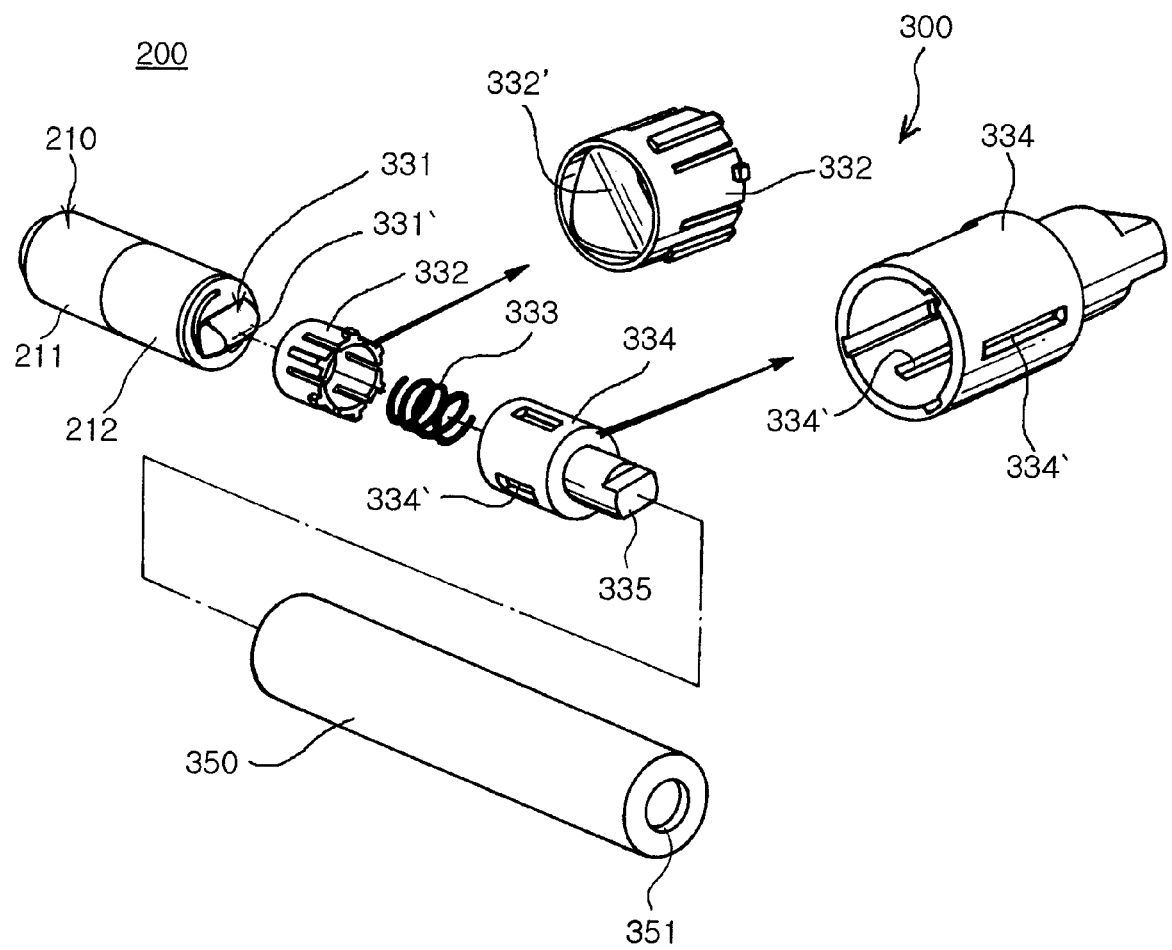
FIG. 9 is an exploded, perspective view of a driving unit according to the present invention.

Further, FIGS. 6 to 8 are views illustrating a structure and an operation of a link unit according to still another embodiment of the present invention, FIG. 9 is an exploded, perspective view of a driving unit according to the present invention, and FIG. 10 is a cross-sectional view illustrating an operation of a driving unit during automatic and manual operations according to the first embodiment of the present invention.

First, an inclined-type mobile communication terminal according to the first embodiment of the present invention will be described with reference to FIGS. 3 to 10.

Referring to FIG. 3, an inclined-type mobile communication terminal according to the first embodiment of the present invention includes: the first main body 110; the second main body 120 movable with respect to the first main body 110; a driving unit 200 for supplying driving force required for moving the second main body 120; and a link unit 400 for moving the second main body 120.

At this point, referring to FIG. 4, the link unit 400 has a driving link 420 and a driven link 440 and can additionally include a fixed plate 410 fixed to an upper portion of the first main body 110 and a coupler link 430 fixed to a lower portion of the second main body 120.

The first and the second main bodies 110 and 120 mount a variety of parts for communication as does a general slide-type communication terminal.

For example, the first main body 110 mounts a battery, a keypad, a main printed circuit board (PCB), a microphone, and the second main body 120 can mount a screen display unit (liquid crystal display (LCD)), a vibration motor, and a speaker.

The driving unit 200 supplies driving force required for moving the second main body 120.

At this point, the driving unit 200 is fixed to the first main body side and can be mounted on the fixed plate 410 and fixed to the first main body 110 as will be described below.

Referring to FIG. 9, the driving unit 200 includes: a motor part 210 for supplying driving force required for moving the second main body 120; a power transfer part 300 connected with a rotational shaft of the motor part 210, for transferring the driving force of the motor part 210 to the link unit 400.

The motor part 210 is provided with power from a battery provided to the communication terminal and supplies power required for an automatic opening/closing operation.

Referring to FIG. 9, a geared motor 211 having a gear box 212 at an output side may be used for the motor part 210. The gear box 212 can have an epicyclic-gear-type reducer having a constant reducing ratio of about more than 300:1 so that driving torque may be amplified and performs a reduction function and changeover prevention function at the same time.

In the meantime, the power transfer part 300 has its one side connected with a rotational shaft of the motor part 210 in an axial direction and has its other side connected with the driving link 420 to transfer driving force required for moving the second main body 120 to the link unit 400 during automatic opening/closing operation.

At this point, the power transfer part 300 selectively transfers or receives driving force of the motor part 210 or external force through a pair of members selectively engaged with an elastic member 333.

Referring to FIG. 9, the power transfer part 300 may include: a hinge shaft 331 fixed to the rotational shaft of the motor part 210, for transferring the driving force of the motor part 210; a slide cam 332 selectively engaged with the hinge shaft 331 by a predetermined angle; a guide cam 334 for relatively restricting the slide cam 332 in a rotational direction and receiving the slide cam 332 in a movable manner to an axial direction; and the elastic member 333 for providing elastic force for allowing the slide cam 332 to be selectively engaged with the hinge shaft 331.

At this point, the one pair of members selectively engaged with an elastic member 333 include the hinge shaft 331 and the slide cam 332.

The hinge shaft 331 is fixed to the rotational shaft of the motor part 210 and rotated by driving of the motor part 210, and the slide cam 332 is selectively engaged with the hinge shaft 331 by elastic force of the elastic member 333.

More desirably, referring to FIG. 9, the hinge shaft 331 has a protuberance 331' having a taper to act as a male-type cam and the slide cam 332 has a groove 332' that corresponds to the protuberance 331' of the male-type cam on its one side to act as a female-type cam.

As will be described below, in case the opening/closing operation is completed by 180° rotation of the hinge shaft 331, the hinge shaft 331 may be engaged with the slide cam 332 every 180°.

On the contrary, it is possible to form the slide cam 332 as a male-type cam and the hinge shaft 331 as a female-type cam.

In the meantime, the guide cam 334 relatively restricts the slide cam 332 in a rotational direction and receiving the slide cam 332 in a movable manner to an axial direction. That is, referring to FIG. 9, the guide cam 334 has a key groove 334' on its circumferential portion. The slide cam 332 is key-fixed to the key groove 334'. Thus, the slide cam 332 is fixed to the guide cam 334 in its rotational direction to be rotated together when the guide cam rotates and is movable as much as a length of the key groove 334' to an axial direction.

The elastic member 333 acts in such a way that the slide cam 332 is selectively engaged with the hinge shaft 331. That is, the elastic member 333 is positioned between the slide cam 332 and the guide cam 334 to act for pressurizing the slide cam 332 toward a hinge shaft side 331. For that purpose, the elastic member 333 may be a compressed coil spring.

Figure 10A:
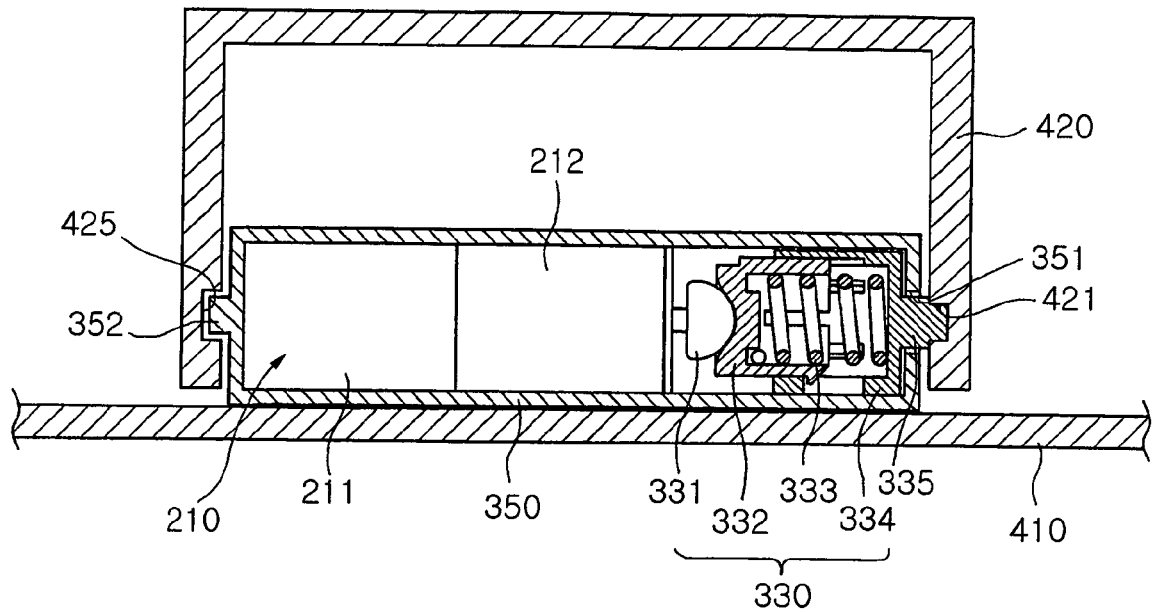
FIG. 10A is a view illustrating an automatic opening/closing operation and FIG. 10B is a view illustrating a manual opening/closing operation.
Figure 10B:
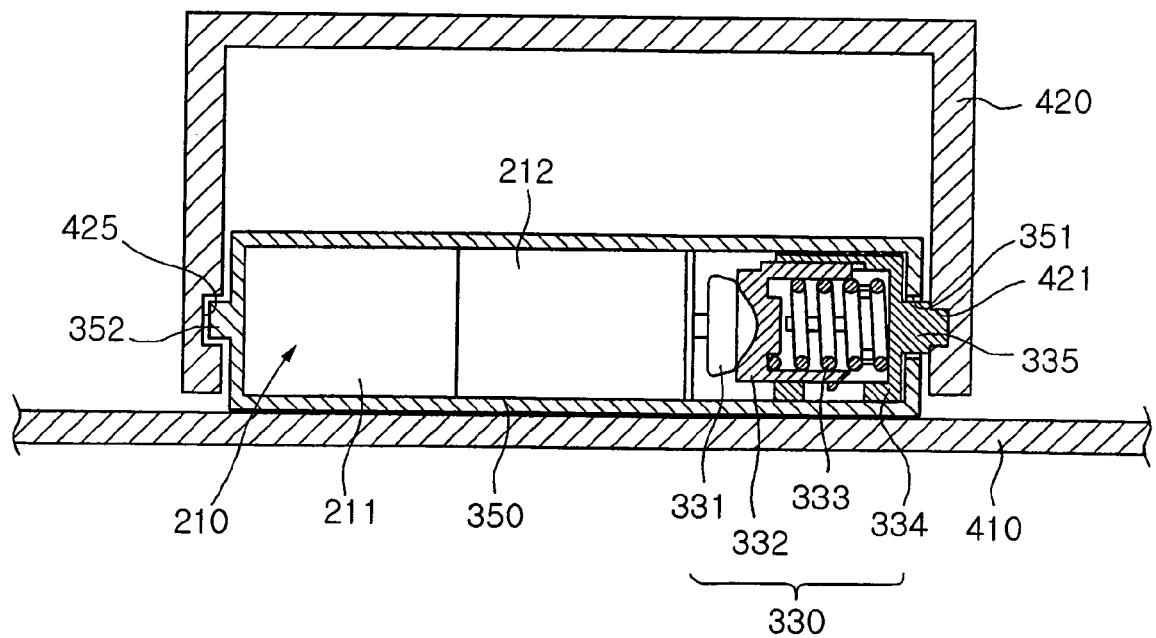

The elastic member 333 is configured to have elastic force greater than the driving force of the motor part 210 and smaller than external force. In case of an automatic opening/closing operation, the elastic member 333 is expanded to allow the slide cam 332 to be engaged with the hinge shaft 331 and rotated together as illustrated in FIG. 10A. In case of a manual opening/closing operation by external force, the elastic member 333 is compressed to release the engagement of the hinge shaft 331 with the slide cam 332 so that the driving link 410 can be rotated as illustrated in FIG. 10B.

Further, the power transfer part 300 may further include a housing 350 to an inner periphery of which an outer periphery of the motor part 210 is fixed. The hinge shaft 331, the slide cam 332, the elastic member 333, and the guide cam 334 are received in an inside of the housing 350.

At this point, referring to FIG. 10, an output terminal 335 of the power transfer part 300 is fixed to the driving link 420 through a connection part 351 of the housing 350.

It is possible to realize both an automatic and a manual opening/closing operations by using the driving unit 200 having the motor part 210 and the power transfer part 300. To realize the automatic opening/closing operation only, the output terminal (rotational shaft) of the motor part 210 is directly connected with a driving shaft 421 of the driving link 420.

Next, the link unit 400 will be described with reference to FIGS. 4 to 8.

An inclined-type mobile communication terminal of the present invention has the link unit 400 and moves the second main body 120 using operation of the link unit 400.

For the link unit 400, a link apparatus whose degree of freedom (DOF) is 1 can be used. For simplification of constituents, the link apparatus may consist of a four-folded link apparatus but not limited to this.

FIGS. 4 and 5 are views illustrating an example of the link unit 400 for use in the inclined-type mobile communication terminal according to the present invention.

Referring to FIGS. 4 and 5, the link unit 400 has a driving link 420 having its one side 421 fixed to an output terminal of the driving unit 200 so as to be rotated by the driving force of the driving unit 200 and having its other side 422 rotatably connected with the second main body 120 to move the second main body 120, and a driven link 440 for connecting the first main body 110 with the second main body 120 so as to guide a movement of the second main body 120 using rotation of the driving link 420.

The link unit 400 may additionally include: a fixed plate 410 on which the driving unit 200 is mounted and fixed to an upper portion of the first main body 110; and a coupler link 430 fixed to a lower portion of the second main body 120.

At this point, one side 421 of the driving link 420 is fixed to an output terminal of the driving unit 200 mounted on the fixed plate 410 and the other side 422 is rotatably connected with the second main body 120 through the coupler link 430.

Further, the driven link 440 connects the first main body 110 with the second main body 120 through the fixed plate 410 and the coupler link 430 and guides a movement of the second main body 120 depending on rotation of the driving link 420.

In case the fixed plate 410, the driving link 420, the coupler link 430, and the driven link 440 are provided as described above, the link unit 400 can be provided as one module, thus assembly process gets easy.

Embodiment of the link unit 400 will be described in more detail with reference to FIGS. 4 to 8.

FIGS. 4 and 5 are views illustrating the link unit 400 according to an embodiment of the present invention.

Referring to FIG. 4, the link unit 400 has a four-folded structure including the fixed plate 410, the driving link 420, the coupler link 430, and the driven link 440.

At this point, the first main body 110 is fixed to the fixed plate 410 through an assembly hole 416 and the second main body 120 is fixed to the coupler link 430 through an assembly hole 433. The first main body 110 is opened or closed by driving of the four-folded link apparatus 400. That is, from a state of FIG. 3A where the first main body 110 is closed, a state of FIG. 3B where the first main body is being opened/closed is performed and then a state of FIG. 3C where the first main body 110 is completely opened is achieved.

Further, parts such as a keypad is mounted on the fixed plate 410 and a flexible printed circuit board (FPCB) is provided to an LCD of the second main body 120 through a through hole 413 illustrated in FIG. 4. Referring to FIG. 10, one side 421 of the driving link 420 is connected with an output terminal of the power transfer part 300 through a connection part 351 of the housing 350 and the other side 422 is rotatably connected with one side 431 of the coupler link 430.

Referring to FIGS. 4 and 5, one side of the couple,r link 430 is rotatably connected with the other side 422 of the driving link 420 and the other side 432 is rotatably connected with one side 441 of the driven link 440.

Further, one side of the driven link 440 is rotatably connected with the other side 432 of the coupler link 430 and the other side 442 is connected with a shaft support part 412 installed in the fixed plate 410 so as to be spaced from the output terminal 355 fixed to the driving link 420. The driven link 440 is rotatably installed through the shaft support part 412 of the fixed plate 410.

At this point, for realization of a stable opening/closing operation, the driving link 420, the coupler link 430, and the driven link 440 may be connected at left and right sides of the fixed plate 410, respectively, as illustrated in FIG. 4.

That is, referring to FIG. 10, one side 421 of the driving link 420 is fixed to the output terminal 335 of the power transfer part 300 and a groove or a protuberance 425 formed at a side opposite to the output terminal 335 of the power transfer part 300 is rotatably received in a protuberance or a groove 352 formed at the housing 350 in response to the groove or the protuberance 425.

Figure 5B:
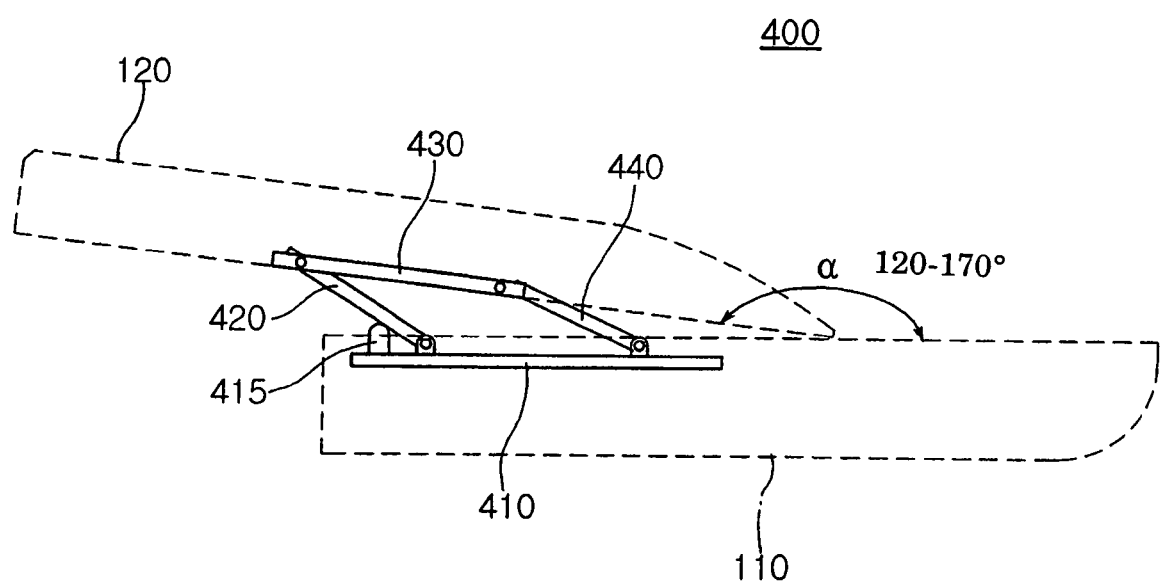
FIG. 5B is a view illustrating a state in which movement of the second main body is completed.

In the meantime, to improve communication quality through an ideal arrangement of the transmitter and the receiver, an angle α formed by the first and the second main bodies 110 and 120 when the first main body 110 is opened may be 120–170° (refer to FIG. 5B). More preferably, the angle forms 150° as does in the folder-type communication terminal.

Further, referring to FIG. 5B, the fixed plate 410 can have a stopper 415 for contacting the driving link 420 to prevent additional rotation of the driving link 420. Otherwise, it is possible to prevent additional rotation of the driving link 420 by having a front surface of the first main body 110 contact the driving link 420.

Figure 5C:
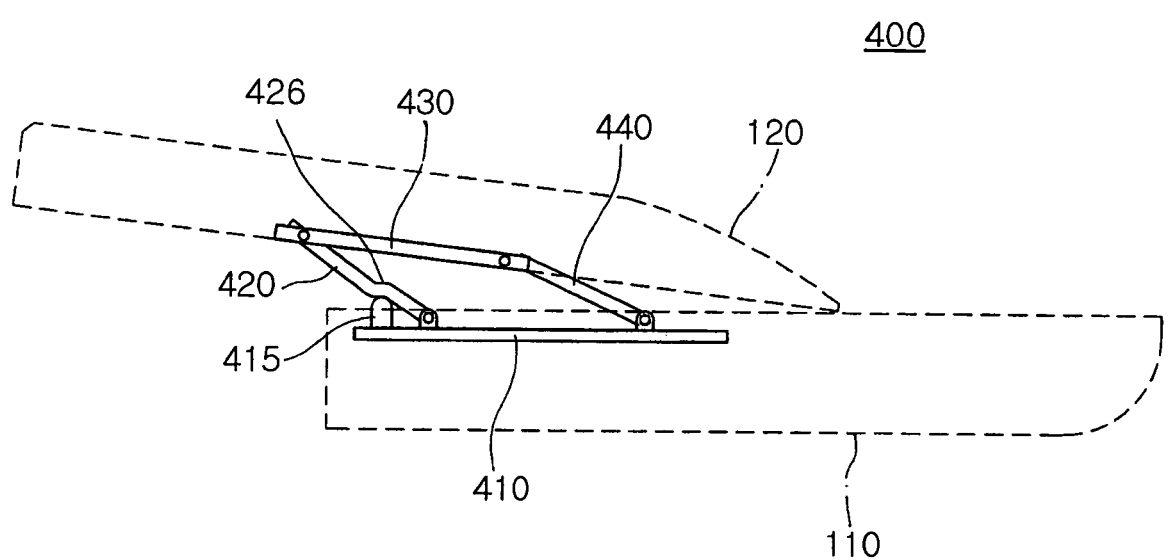
FIG. 5C is a view illustrating another state in which movement of the second main body is completed.

At this point, referring to FIG. 5C, the driving link 420 may have a curved part 426 so as to stably contact the stopper 415 and the curved part 426 can be so formed as to contact the front surface of the first main body.

In the meantime, the fixed plate 410, the driving link 420, the coupler link 430, and the driven link 440 may be configured to be maintained in an overlapped state as illustrated in FIG. 4 to prevent a gap from being generated between the first main body 110 and the second main body 120 when the first and the second main bodies 110 and 120 remain closed.

The four-folded link apparatus 400 of FIG. 5 has been illustrated for an example purpose only, thus various modifications can be possible depending on a design factor. That is, it is possible to provide a communication terminal opened/closed in a desired angle through adjustments of a length R1 of the driving link, a length R2 of the driven link, a length 1 of the coupler link, and an inter-axis distance d between the driving shaft 411 and the shaft support part 412.

FIG. 6 is a view illustrating a structure and an operation of a link unit 400a according to another embodiment of the present invention, in which FIG. 6A is a view illustrating a state before the second main body 120 is moved, FIG. 6B is a view illustrating a state in which movement of the second main body 120 is completed.

The link unit 400a of FIG. 6 includes a fixed plate 410a, a driving link 420a, a coupler link 430a, and a driven link 440a. The link unit 400a is the same as the link unit 400 illustrated in FIGS. 4 and 5 except that one side 441a of the driven link 440a receives one side 432a of the coupler link 430a in a sliding manner.

That is, the one side 421a of the driving link 420a is fixed to a driving shaft 411a of the fixed plate 410a that corresponds to an output terminal of a driving unit 200 and the other side 422a is rotatably connected with one side 431a of the coupler link 430a.

In case of the link unit 400a of FIG. 6, if driving force is provided from the driving unit 200, the driving link 420a is rotated. If the driving link 420a is rotated, the one side 432a of the coupler link 430a is received in the one side 441a of the driven link 440a and slid to rotate the driven link 440a, whereby the second main body 120 fixed to the coupler link 430a is moved.

To avoid unnecessary repeated description, detail descriptions will be omitted for the same parts or the similar parts of the link unit 400 illustrated in FIGS. 4 and 5.

FIG. 7 is a view illustrating a structure and an operation of a link unit 400b according to still another embodiment of the present invention.

The link unit 400b of FIG. 7 includes a fixed plate 410b, a driving link 420b, a coupler link 430b, and a driven link 440b. The link unit 400b is the same as the link unit 400 illustrated in FIGS. 4 and 5 except that a guide part 412b for guiding the driven link 440b is formed in the fixed plate 410b and that the driven link 440b is slid along the guide part 412b.

That is, one side 441b of the driven link 440b is rotatably connected with one side 432b of the coupler link 430b and the other side 442b is slid along the guide part 412b formed on the fixed plate 410b.

For example, the guide part 412b is formed in form of a concave groove on both sides of the fixed plate 410b and the driven link 440b can be formed in form of a cylindrical protuberance fixed at and protruded from the one side 432b of the coupler link 430b. A structure and a shape of the guide part 412b and the driven link 440b are not limited to this.

In case of the link unit 400b of FIG. 7, if driving force is provided from the driving unit 200, the driving link 420b is rotated. If the driving link 420b is rotated, the driven link 440b connected with the coupler link 430b is slid along the guide part 412b, whereby the second main body 120 fixed to the coupler link 430b is moved.

To avoid unnecessary repeated description, detail descriptions will be omitted for the same parts or the similar parts of the link unit 400 illustrated in FIGS. 4 and 5.

FIG. 8 is a view illustrating a structure and an operation of a link unit 400c according to further another embodiment of the present invention.

The link unit 400c of FIG. 8 includes a fixed plate 410c, a driving link 420c, a coupler link 430c, and a driven link 440c. The link unit 400c is the same as the link unit 400 illustrated in FIGS. 4 and 5 except that one side 441c of the driven link 440c is slid along a guide part 432c formed in the coupler link 430c.

That is, one side 441c of the driven link 440c is slid along the guide part 432c formed in the coupler link 430c and the other side 442c is rotatably connected with a shaft support part 412c installed in the fixed plate 410c.

For example, the guide part 432c is formed in form of a concave groove on both sides of the coupler link 430c and one side 441c of the driven link 440c can be formed in form of a cylindrical protuberance. A structure and a shape of the guide part 412b and the driven link 440b are not limited to this but known guide structures can be used.

In case of the link unit 400c of FIG. 8, if driving force is provided from the driving unit 200, the driving link 420c and the coupler link 430c are rotated. If the coupler link 430c is rotated, the one side 441c of the driven link 440c is received in the one side of the coupler link 430c and slid, so that the other side 442c of the driven link 440c is rotated, whereby the second main body 120 fixed to the coupler link 430c is moved.

To avoid unnecessary repeated description, detail descriptions will be omitted for the same parts or the similar parts of the link unit 400 illustrated in FIGS. 4 and 5.

Figure 11:
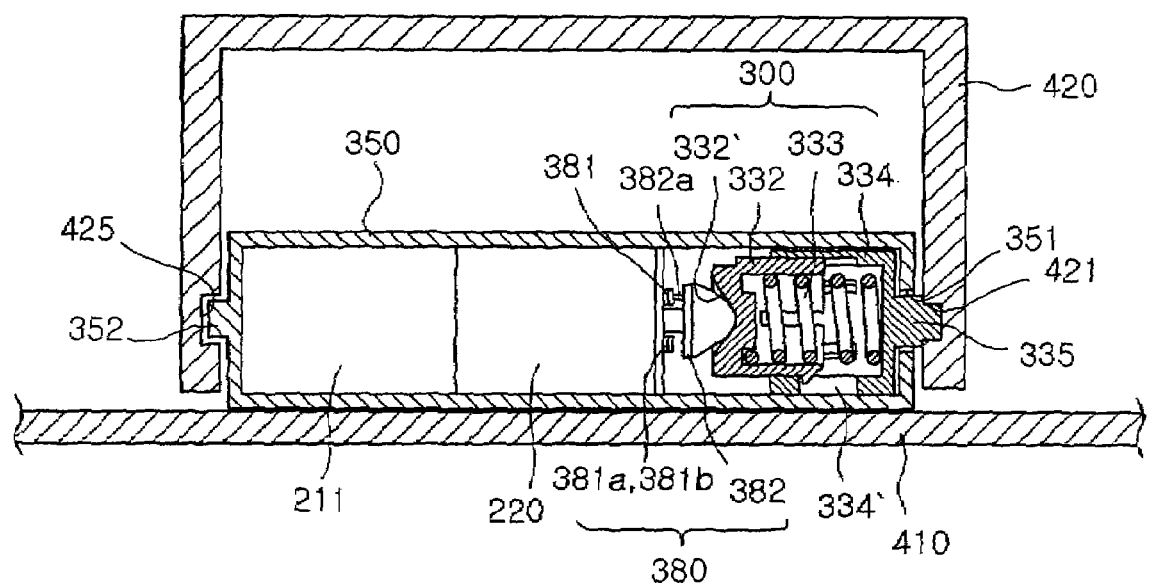
FIG. 11 is a cross-sectional view of a driving unit of an inclined-type mobile communication terminal having a sensor unit according to the present invention.
Figure 12A:
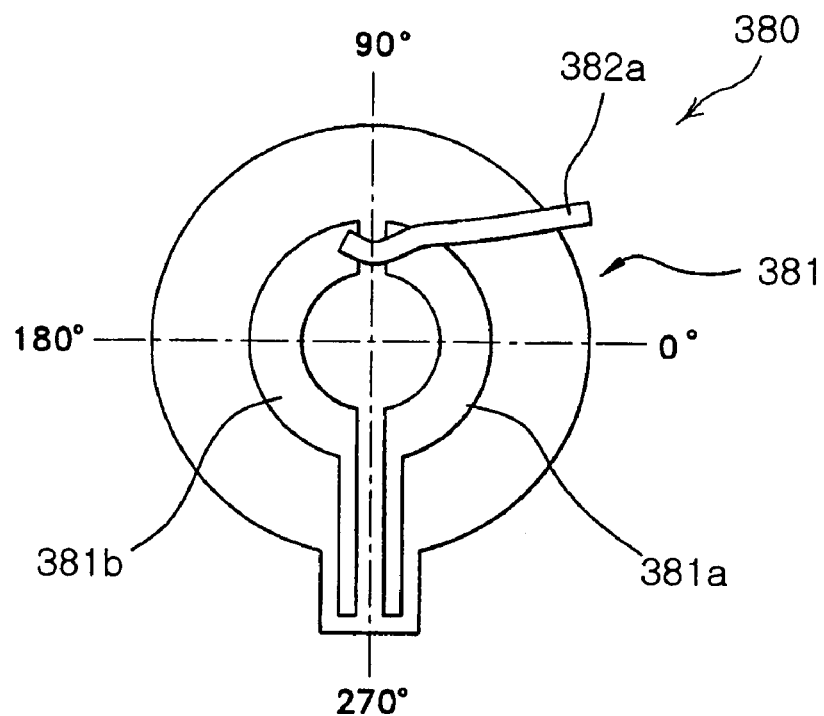
FIGS. 12a and 12b are a view schematically illustrating a brush housing and a rectifying housing of a sensor unit illustrated in FIG. 11 according to an embodiment of the present invention.
Figure 12B:
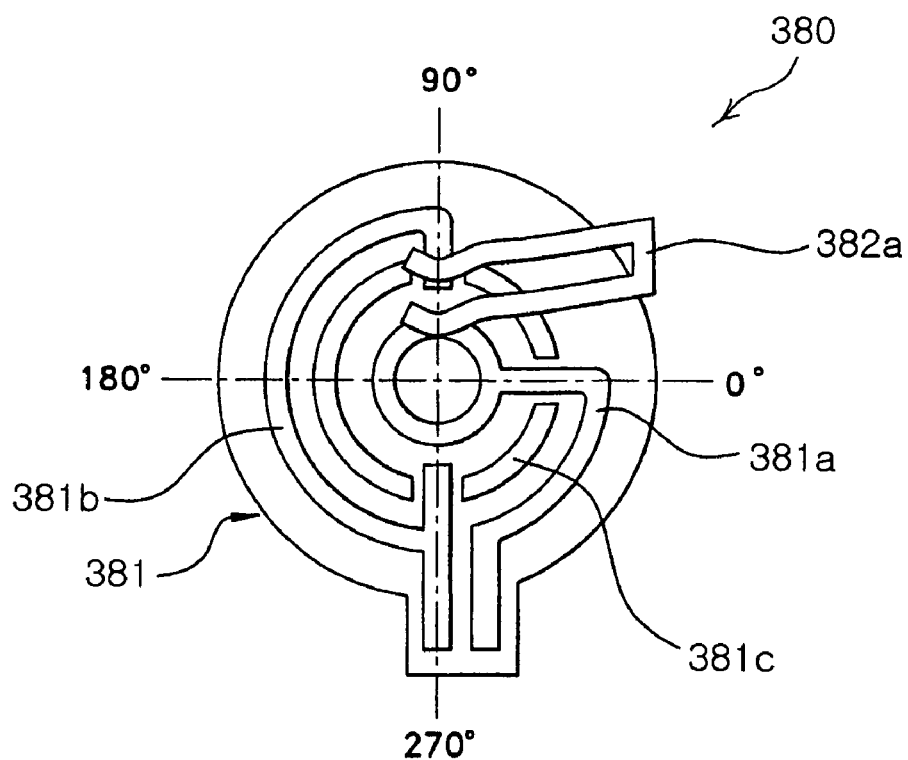

FIG. 11 is a side, cross-sectional view illustrating a state where a sensor of an inclined-type mobile communication terminal is mounted according to the present invention, and FIG. 12 is a view schematically illustrating a brush housing and a rectifying housing of a sensor unit illustrated in FIG. 11 according to an embodiment of the present invention.

Referring to FIG. 11, the first embodiment of the present invention can further include: a sensor unit 380 having a contact type sensor or a non-contact type sensor for detecting that a predetermined portion of the hinge shaft 331 is rotated a predetermined angle with respect to the motor part 210 in order to control completion of an opening/closing operation of the second main body 120; and a driving controller (not shown) for controlling a driving of the motor part 210 using a signal of the sensor unit 380.

In case of providing the sensor unit 380 in form of a contact type sensor, the sensor unit 380 may have a brush housing 382 formed by a protruded brush 382a and a rectifying housing 381 where the first pattern 381a and the second pattern 381b are spaced so as to be electrically conducted every predetermined angles through electric contact with respect to the brush 382a as illustrated in FIGS. 11 and 12.

At this point, if the first pattern 381a and the second pattern 381b of the rectifying housing are electrically connected and conducted each other every predetermined angles by the brush 382a of the brush housing as the brush housing 382 is relatively rotated with respect to the rectifying housing 381 due to rotation of the motor part 210, the sensor unit 380 applies a driving stop signal to the driving controller (not shown).

That is, in case of using the hinge shaft 331 and the slide cam 332 engaged each other every 180°, the brush housing and the rectifying housing can be so formed as to generate a driving stop signal using 180° rotation of the motor part.

The shape of the first and the second patterns 381a and 381b and the number of the brush 382a can be formed in various ways so that they may be conducted every desired angles. For example, in case the first and the second patterns are conducted by the brush on a phase of 360°, it is also possible to allow them to be conducted every 180° using two brushes.

Further, in case the sensor unit 380 is formed in form of the non-contact type sensor, the construction thereof is similar to the case of the above-described contact type sensor. For example, the sensor unit 380 can include a detecting sensor switched when magnetic field is detected and a magnet so installed as to correspond to the detecting sensor to diverge the magnetic field.

At this point, as the detecting sensor and the magnet are relatively rotated due to rotation of the motor part 210, the sensor unit applies a driving stop signal to the driving controller when the detecting sensor and the magnet face each other and are switched every predetermined angles (180°) even though they do not contact.

Here, for the detecting sensor, a variety of kinds such as a Hall sensor including a Hall integrated circuit (IC), a sensor using magnetoresistance (MR) effect element can be used.

Referring to FIG. 11, the contact type or the non-contact type sensor can be installed at one side of the motor part 210 and at one end of the hinge shaft 331 facing the motor part 210 and can be installed on a protuberance portion of the hinge shaft 331 and on an inner surface of the housing facing the protuberance portion.

It is possible to improve assembly efficiency with respect to the main bodies by providing the opening/closing apparatus as one module and to obtain an efficient sensor structure and improve assembly efficiency of the sensor by providing the sensor unit within the module.

Next, an inclined-type mobile communication terminal according to the second embodiment of the present invention will be described.

Figure 13:
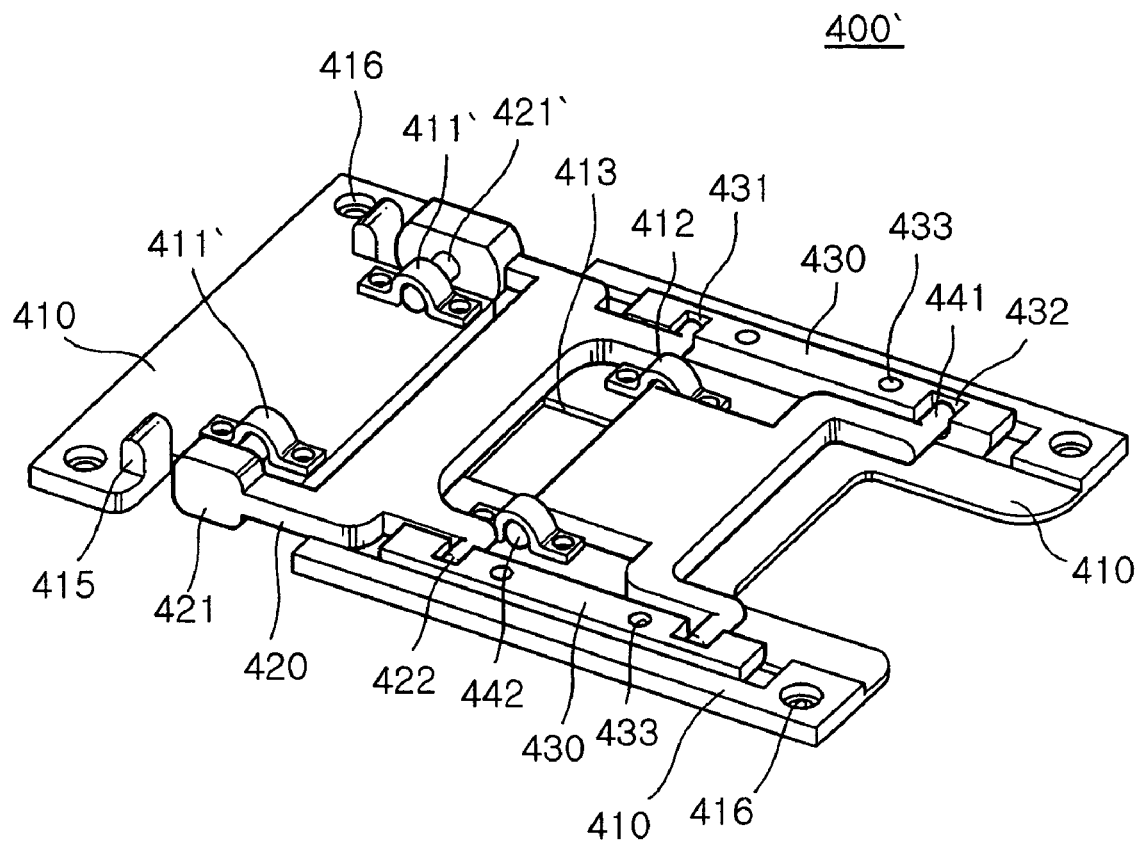
FIG. 13 is a perspective view of a four-folded link apparatus according to the second embodiment of the present invention.

Referring to FIGS. 3 and 13, the inclined-type mobile communication terminal according to the second embodiment includes: the first main body 110, the second main body 120 for opening/closing the first main body 110, and a link unit 400'.

Referring to FIG. 13, the lint unit 400' includes: a driving link 420 having its one side 421' rotatably connected with the first main body 110 and having its other side 422 rotatably connected with the second main body 120, for moving the second main body 120 while being rotated by external force; and a driven link 440 for connecting the first main body 110 with the second main body 120 so as to guide a movement of the second main body 120 using rotation of the driving link 420.

Referring to FIG. 13, the link unit 400' may additionally include a fixed plate 410 fixed to an upper portion of the first main body 110 and a coupler link 430 fixed to a lower portion of the second main body 120.

At this point, the driving link 420 connects a driving shaft 411' of the fixed plate 410 fixed to the first main body 110 with one side 431 of the coupler link 430 fixed to the second main body 120 to rotate to move the second main body 120.

Further, the driven link 440 connects the first main body 110 with the second main body 120 through the fixed plate 410 and the coupler link 430 to guide a movement of the second main body 120 using rotation of the driving link 420.

In case the fixed plate 410, the driving link 420, the coupler link 430, and the driven link 440 are provided as described above, the link unit 400' can be provided as one module, so that assembly efficiency gets easy.

As described above, the link unit 400' according to the second embodiment can use the link unit illustrated in FIGS. 4 to 8 and is the same as the link unit 400 of the first embodiment except that the one side 421' of the driving link 420 is rotatably connected with the driving shaft 411' of the fixed plate 410.

For example, referring to FIGS. 3 to 13, the fixed plate 410 is fixed to an upper portion of the first main body 110 and the driving link 420 has its one side 421' rotatably connected with the driving shaft 411' installed on the fixed plate 410.

Further, the coupler link 430 has its one side rotatably connected with one side of the driving link 420 and is fixed to a lower portion of the second main body 120.

The driven link 440 has its one side 441 rotatable connected with the other side 432 of the coupler link 430 and has its other side 442 rotatably connected with a shaft support part 412 installed at the fixed plate 410.

The second embodiment is intended for realizing a manual opening/closing operation. Constructions of the first and the second main bodies 110 and 120 and the link unit 400' are the same as those of the first embodiment. To avoid unnecessary repeated description, detail descriptions will be omitted for the same parts or the similar parts.

In the meantime, the inclined-type mobile communication terminal of the second embodiment can additionally have a power transfer part (not shown). The power transfer part has an elastic member for restricting rotation of the driving link 420 or the driven link 440 by providing elastic force if external force for opening/closing the first main body 110 dose not exist and allowing the driving link 420 or the driving link 440 to be rotated by being transformed by the elastic force if external force greater than the elastic force is applied to open/close the first main body 110.

A known power transfer structure can be used for the slide-type communication terminal having the elastic member.

For example, the power transfer part 300 of the first embodiment can be used. In that case, the power transfer part 300 can further include a pair of members selectively engaged by the elastic member 333 as illustrated in FIGS. 9 and 10.

At this point, the one pair of members include the hinge shaft 331 and the slide cam 332 illustrated in FIGS. 9 and 10. The hinge shaft 331 can be fixed to one end of the housing 350.

The above-described inclined-type mobile communication terminal according to the first embodiment can perform the automatic or manual operation. The inclined-type mobile communication terminal according to the second embodiment can perform the manual operation.

First, the automatic opening/closing operation according to the first embodiment will be described with reference to FIGS. 5, 10A, and 11.

If a user presses an opening/closing operation switch (not shown) with the first main body 110 closed, the driving controller (not shown) checks whether a current state is an open state or a closed state. After that, the driving controller drives the motor part 210 in a direction such that the first main body 110 is opened depending on a signal inputted from the switch. Of course, in a state where the first main body 110 is opened, the motor part 210 will operate in an opposite direction.

The judgment as to the closed or the opened state can be recognized by a circuit built in the terminal itself. For example, a circuit such that when a user opens the first main body 110, an LCD is lit up and when a user closes the first main body 110, an LCD is turned off, can also be used.

Referring to FIG. 10A, if the motor part 210 operates, the hinge shaft 331 connected with the rotational shaft of the motor part 210 is rotated. As the hinge shaft 331 is rotated, the slide cam 332 engaged with the hinge shaft 331 by the elastic member 333 is rotated. That is, the protruded portion 331' of the hinge shaft and the concave portion 332' of the slide cam are engaged and rotated together.

Further, the slide cam 332 and the key-fixed guide cam 334 are rotated and the driving link 410 is rotated together with the guide cam 334.

Resultantly, if the driving link 410 is rotated, the coupler link 430 and the driven link 440 connected with the driving link 410 are rotated, whereby the second main body 110 fixed to the coupler link 430 opens/closes the first main body 110 fixed to the fixed plate 410.

In the meantime, referring to FIG. 11, a rotation of a predetermined angle (180° in case the hinge shaft and the slide cam are engaged every 180°) is detected by the sensor unit 380 for detecting a relative rotation of the hinge shaft 331 and the motor 200, the sensor unit 380 applies a driving stop signal to the driving controller (not shown), and an opening/closing operation is completed.

In the meantime, while the opening/closing operation starts and is completed, the hinge shaft 331 rotates 180° with respect to the motor part 210 but the driving link 420 rotates an angle smaller than 180°.

Here, the elastic member 333 can be so set as to be a maximum compression state when the driving link 420 is perpendicular to the front surface of the first main body 110. Thus, presuming that a rotational angle of the driving link 420 is 150°, a position misalignment of 15° is generated under a complete-open state or a complete-close state, so compression force still remains in the elastic member.

The remaining compression force prevents the opening/closing operation from starting due to extremely small external force acted on the first main body 110, thus the terminal can be stably used.

The automatic opening/closing operation from a state where the first main body 110 is opened to a state where the first main body 110 is closed, which is a reverse operation, is performed using the above-described same principle.

An automatic operation of the link units 400a, 400b, and 400c of FIGS. 6 to 8 are similar to that of the link unit 400 of FIG. 5. To avoid unnecessary repeated description, detail descriptions will be omitted.

Next, a manual opening/closing operation according to the first and the second embodiments will be described with reference to FIGS. 5 and 10B.

For example, if a user pushes the second main body 120 to an opening direction under a closed state, external force is applied to the coupler link 430 fixed to the second main body 120.

In the meantime, the motor part 210 includes a geared motor and its rotation is limited in case the motor does not operate, thus the elastic member 333 is compressed by external force and the engagement of the hinge shaft 331 with the slide cam 332 is released, whereby the driving link 420 becomes a rotatable state.

That is, referring to FIG. 10B, while the elastic member 333 is compressed, the engagement of the one pair of members, i.e., the engagement of the hinge shaft 331 and the slide cam 332 is released, so that the driving link 420 and the driven link 440 becomes a rotatable state, whereby the second main body 110 fixed to the coupler link 430 opens/closes the first main body 110 fixed to the fixed plate 410.

In the meantime, the elastic member 333 can be so set as to be a maximum compression state when the driving link 420 is perpendicular to the front surface of the first main body 110. Thus, in that case, a position misalignment of the hinge shaft 331 and the slide cam 332 is 90°, which is a maximum value. If the position misalignment exceeds the position of the maximum value, the opening/closing operation is completed by action of elastic force applied from the elastic member 333 even without additional external force.

If the external force is removed before the position misalignment angle between the hinge shaft 331 and the slide cam 332 becomes 90°, the elastic force of the elastic member 333 is applied to restore the second main body 120 back to its closed-position.

That is, the position misalignment of the hinge shaft 331 and the slide cam 332 is less than 90°, the second main body 120 is restored to its origin (closed position) by restoring force of the elastic member 333. On the contrary, the position misalignment is greater than 90°, the second main body 120 is moved to a complete-open state by the restoring force of the elastic member 333.

Therefore, according to the present invention, a manual operation of complete opening/closing is performed by one time of application of the external force and the terminal is opened/closed in an easier and swifter manner.

In the meantime, the inclined-type mobile communication terminal of the second embodiment operates in a similar manner to the first embodiment except that the motor part 210 is not provided and the hinge shaft 331 is fixed to the housing 350.

That is, in case the external force greater than the elastic force of the elastic member 333 is applied, the elastic member 333 is transformed and the driving link 410 or the driven link 440 is possibly rotated, whereby the second main body 120 fixed to the coupler link 430 is moved.

According to the present invention having the above-described construction, the communication terminal is opened/closed in a manner totally different from the mobile communication terminal of the related art, so that various consumer demands can be satisfied. Further, automatic operation and a smooth manual operation can be realized, so that a consumer can use the communication terminal conveniently.

In addition, since the receiver and the transmitter form an angle smaller than 180° and the antenna characteristics is less influenced by the second main body, excellent communication quality can be obtained, and the rack is not required so that the appearance is beautiful compared with the slide-type communication terminal.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A mobile communication terminal comprising:
   a first main body;
   a second main body movable with respect to the first main body;
   a driving unit fixed to the first main body, for supplying a driving force required for moving the second main body; and
   a link unit including a driving link having a first end fixed to an output terminal of the driving unit so as to be rotated, as a rotating arm, by the driving force of the driving unit on an axis of connection of the driving link and the output terminal and having a second end rotatably connected to the second main body to move the second main body as the driving link rotates, and a driven link for connecting the first main body with the second main body and guiding a movement of the second main body as the driving link is rotated by the driving force.

2. The terminal of claim 1, wherein the link unit further includes a fixed plate on which the driving unit is mounted and fixed to an upper portion of the first main body and a coupler link fixed to a lower portion of the second main body, and the driving link connects the terminal of the driving unit with a first end of the coupler link fixed to the second main body and rotates to move the second main body, and the driven link connects the fixed plate fixed to the first main body with the coupler link fixed to the second main body.

3. The terminal of claim 2, wherein a first end of the driven link is rotatably connected with a second end of the coupler link and a second end of the driven link is rotatably connected with a shaft support part installed at the fixed plate.

4. The terminal of claim 2, wherein a first end of the driven link receives a second end of the coupler link in a sliding manner and the second end of the driven link is rotatably connected with a shaft support part installed at the fixed plate.

5. The terminal of claim 2, wherein a first end of the driven link is rotatably connected with a second end of the coupler link and a second end of the driven link is slid along a guide part formed at the fixed plate.

6. The terminal of claim 2, wherein a first end of the driven link is slid along a guide part formed at the coupler link and a second end of the driven link is rotatably connected with a shaft support part installed at the fixed plate.

7. The terminal of claim 2, wherein the fixed plate has a stopper for contacting the driving link to prevent the driving link from rotating, getting out of an angle set in advance.

8. The terminal of claim 1, wherein when movement of the second main body is completed and the first main body is opened, an angle formed by the first and the second main bodies is 120–170°.

9. The terminal of claim 1, wherein the driving unit has a motor part for supplying a driving force required for moving the second main body and a power transfer part connected with a rotational shaft of the motor part, for transferring the driving force of the motor part.

10. The terminal of claim 9, wherein the power transfer part has a pair of members selectively engaged and an elastic member for allowing the one pair of members to be selectively engaged.

11. The terminal of claim 10, wherein the one pair of members comprise a hinge shaft fixed to the rotational shaft of the motor part, for transferring the driving force of the motor part and a slide cam selectively engaged with the hinge shaft every predetermined angle,
   the power transfer part further includes a guide cam for relatively restricting the slide cam in a rotational direction and receiving the slide cam in a movable manner to an axial direction and connected with the driving link, and
   the elastic member provides elastic force for allowing the slide cam to be selectively engaged with the hinge shaft.

12. The terminal of claim 11, wherein the hinge shaft has a protuberance having a taper to act as a male-type cam, the slide cam has a groove that corresponds to the protuberance of the male-type cam on its one side to act as a female-type cam, and the hinge shaft and the slide cam are engaged every 180°.

13. The terminal of claim 11, wherein the elastic member is positioned between the slide cam and the guide cam and pressurizes the slide cam toward a hinge shaft side.

14. The terminal of claim 11, further comprising
   a sensor unit having a contact type sensor or a non-contact type sensor for detecting that a predetermined portion of the hinge shaft is rotated a predetermined angle with respect to the motor part in order to control completion of a sliding operation; and
   a driving controller for controlling a driving of the motor part using a signal of the sensor unit.

15. The terminal of claim 14, wherein the sensor unit comprises:
   a brush housing formed by a protruded brush; and
   a rectifying housing where a first pattern and a second pattern are spaced so as to be electrically conducted every predetermined angle through electric contact with respect to the brush, and
   if the first pattern and the second pattern of the rectifying housing are electrically connected and conducted each other every predetermined angle by the brush of the brush housing as the brush housing is relatively rotated with respect to the rectifying housing due to rotation of the motor part, the sensor unit applies a driving stop signal to the driving controller.

16. A mobile communication terminal comprising:
   a first main body;
   a second main body movable with respect to the first main body; and
   a link unit including a driving link, having a first end rotatably connected to the first main body and having a second end rotatably connected to the second main body, for moving the second main body while the driving link, as a rotating arm, is being rotated on an axis of connection of the driving link and the first main body by an external force, and a driven link for connecting the first main body to the second main body and guiding a movement of the second main body when the driving link is rotated by the external force.

17. The terminal of claim 16, wherein the link unit further includes a fixed plate fixed to an upper portion of the first main body and a coupler link fixed to a lower portion of the second main body, the driving link connects a first end of the fixed plate fixed to the first main body with a first end of the coupler link fixed to the second main body and rotates to move the second main body, and the driven link connects the fixed plated fixed to the first main body with the coupler link fixed to the second main body.

18. The terminal of claim 17, wherein a first end of the driven link is rotatably connected with a second end of the coupler link, and a second end of the driven link is rotatably connected with a shaft support part installed at the fixed plate.

19. The terminal of claim 16, further comprising:
a power transfer unit having an elastic member for restricting rotation of the driving link or the driven link by providing elastic force if external force for moving the second main body dose not exist and allowing the driving link to be rotated by being transformed by the elastic force if external force greater than the elastic force is applied,
wherein the driven link has its first end fixed to a first end of the power transfer unit so as to be selectively rotated.

20. The terminal of claim 19, wherein the power transfer unit further includes a pair of members selectively engaged by the elastic member.

* * * * *